United States Patent [19]
Acevedo

[11] 3,824,691
[45] July 23, 1974

[54] ADJUSTABLE SPLIT ARTIFICIAL TOOTH WITH MICROMETER WHEEL MEANS FOR DYNAMICALLY ADJUSTING THE MESIO-DISTAL TOOTH DIMENSION

[76] Inventor: Raul Acevedo, Arzuaga No. 9, Rio Piedras, San Juan, P.R.

[22] Filed: Nov. 6, 1973

[21] Appl. No.: 413,215

[52] U.S. Cl. ................................................. 32/71
[51] Int. Cl. ........................................... A61c 19/00
[58] Field of Search .................... 32/71, 60, 8, 2, 64

[56] References Cited
UNITED STATES PATENTS
1,048,382   12/1912   Allen .................................... 32/71
1,279,805   9/1918   Whitaker ............................... 32/71

Primary Examiner—Robert Peshock
Attorney, Agent, or Firm—Abraham A. Saffitz

[57] ABSTRACT

An adjustable split artificial tooth comprising a micrometric wheel on a threaded rod which separates the tooth halves permits very precise dynamic adjustments of the mesio-distal tooth dimension while an elastomer sleeve holds the tooth halves at the top in tight mating relation. This dynamic metrically adjustable tooth is highly useful for illustrating tooth conditions to patients and can be used as a study model for educational purposes.

1 Claim, 4 Drawing Figures

PATENTED JUL 23 1974 3,824,691

ADJUSTABLE SPLIT ARTIFICIAL TOOTH WITH MICROMETER WHEEL MEANS FOR DYNAMICALLY ADJUSTING THE MESIO-DISTAL TOOTH DIMENSION

CROSS REFERENCE TO RELATED APPLICATIONS

My copending application Ser. No. 329,047, filed Feb. 2, 1973 is entitled Orthodontic Dental Study Model.

BACKGROUND OF THE INVENTION

1. Field of the Invention

In my copending application above crossreferenced, I disclose an orthodontic study device used for illustrating teeth conditions to a patient in which the position of each tooth may be universally adjusted. The tooth in my copending application is in the form of a crown and is connected by a ball and socket joint to one end of a post which is secured at its other end to a supporting base plate. A selected number of devices and their crowns are assembled in a dental arch formation with the crowns adjusted to desired positions to illustrate various spatial relationships of the teeth in this copending device.

The dynamically adjustable split tooth of the present invention is an adjunct to my orthodontic study model of my copending application and is a valuable teaching aid in association with this educational use of my study model.

2. Description of the Prior Art

Heretofore, artificial teeth have been provided with cavities and threaded pins or rods for purposes of attachment to a support and an example of such use of threaded pin is found in Craigo, U.S. Pat. No. 1,780,117, which shows a coupling stud formed to fit a socket in the artificial tooth and a dowel removably attached to the stud.

Also, spreading set-screw devices have been used, as for example in Jarvis, U.S. Pat. No. 154,867 granted Sept. 8, 1874 for the purpose of separating teeth in the mouth of the patient.

The spreading set-screw device in Jarvis consists of arms united at one end with a screw for operating the arm and the free points of the two arms engaging the teeth to be separated.

No teaching heretofore has been suggested of splitting a tooth into two halves and gripping the top so that separation of the two halves may be accomplished to bary the mesio-distal dimension of the tooth and thereby provide very precise adjustment of this distance. The present device fulfills a need in the dental education field and permits a single tooth model to be used alone or together with the teaching aids in the device of my copending patent application Ser. No. 329,047, filed Feb. 2, 1973.

SUMMARY OF THE INVENTION

The invention comprises an adjustable split artificial tooth consisting essentially of a shell split into two halves, an elastomer sleeve holding the two halves together at the top and a micrometer wheel engaging the threads of a short threaded rod whose ends are mounted in abitting relation against the inner surface of each half so that when the wheel is turned in one direction the two halves move apart and the tooth is widened while turning the wheel in the other direction the two halves move together. The elastic pull of the elastomer sleeve is such that the two halves are normally pressed towards each other.

BRIEF DESCRIPTION OF THE DRAWING

The preferred form of my adjustable split artificial tooth with micrometer wheel means for dynamically adjusting the mesio-distal tooth dimension is illustrated in the accompanying drawings in which:

As shown in FIGS. 1 and 3, the adjustable split artificial tooth is formed by the insertion of tooth halves 2 and 3, (left and right halves respectfully, see FIGS. 1 and 4) into the elastomer sleeve 1 which holds the two halves tightly together due to the compressive forces exerted by the elastic side walls of the sleeve. These elastic compressive forces are based upon the fact that the sleeve opening is normally slightly smaller than the top portion of the mating shell halves 2 and 3, which causes the side walls to spread slightly while the sleeve wall thickness is such that a constant closing pressure (compression) results.

Within the left half 2 of the split tooth there is provided a screw threaded socket 4 in the solid material of the inner wall tooth half 2 into which is threaded rod 7, which is threaded only at its left side.

Figure 1:
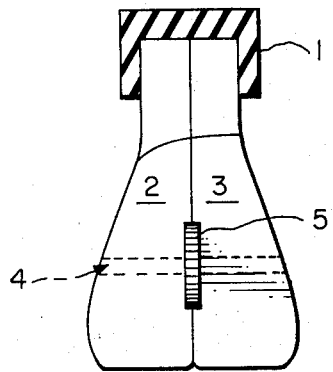
FIG. 1 is a front view with the elastomer sleeve partly in section showing the two halves closed with the wheel at the zero position and the elastomer sleeve holding the two halves tightly together.
Figure 2:
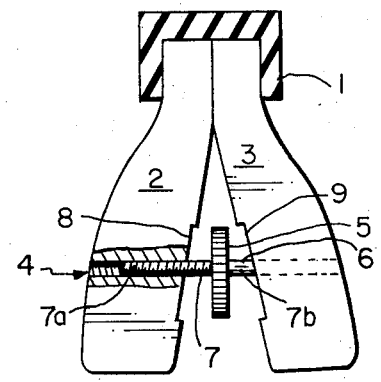
FIG. 2 is a front view of the artificial tooth of FIG. 1 with the two halves separated by opening action of the wheel.
Figure 3:
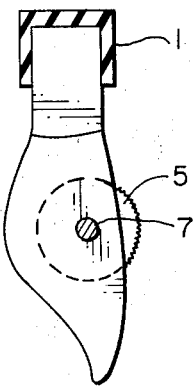
FIG. 3 is a side view of the tooth of FIG. 1.

The nicrometer wheel 5 is fixed at the center of threaded rod 7 but is not threaded at its right side 7b so that the nonthreaded side 7b abuts in a channel 11 against the inner surface of right tooth half 2, while the threaded left side 7a engages the threads in socket 4 to move the two halves apart as shown in FIG. 2 when the wheel 5 is moved counterclockwise.

In a preferred form of the invention, the toothed wheel is made of brass and threaded very accurately, the diameter selected for the incisor tooth of the drawings being 7 millimeters and the wheel being 0.3 millimeters in thickness.

Figure 4:
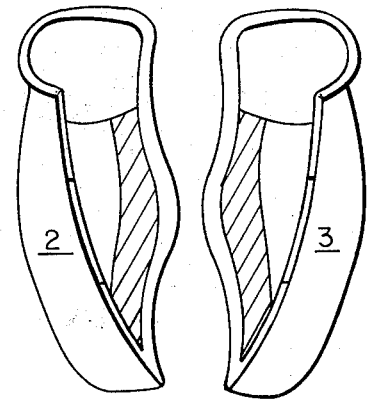
FIG. 4 is a perspective view of the two halves of the tooth of FIG. 1 with the elastomer sleeve being removed.

The rod 7 can also be made of brass and the two tooth halves shown in FIG. 4 may be formed by suitable synthetic resin or of porcelain if desired. Such synthetic resins as polymethyl methacrylate, polyvinyl chloride, copolymer of vinyl chloride and vinyl acetate, cellulose acetate, polystyrene terrephthalate, polycarbonate, acrylonitrile-butadiene-styrene copolymer are some but not all of the resins which may be used. Painted plaster of paris may be used. Sections of the tooth halves may be shaded with pigment to give a more life like appearance.

Having thus disclosed the invention what is claimed is:

1. An adjustable split artificial tooth comprising:
two substantially identical tooth halves, each tooth half include a bored portion for holding a threaded rod which separates the halves;

an adjustable means comprising a micrometric wheel and a threaded rod which separates the tooth halves and permits very precise dynamic adjustments of the mesio-distal tooth dimension; and, an elastomer sleeve which holds the tooth halves at the tope in tight mating relation, said micrometric wheel providing dynamic metrical adjustment of the mesio-distal tooth dimensions useful for illustrating tooth conditions to patients and as a study model for educational purposes.

* * * * *